(12) United States Patent
Kline et al.

(10) Patent No.: US 9,238,334 B2
(45) Date of Patent: Jan. 19, 2016

(54) COMPOSITE LAYER FORMING SYSTEM

(71) Applicant: The Boeing Company, Chicago, IL (US)

(72) Inventors: William Thomas Kline, Burien, WA (US); Larry Earl Gross, Auburn, WA (US); Sayata Ghose, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/804,328

(22) Filed: Jul. 20, 2015

(65) Prior Publication Data

US 2015/0321428 A1 Nov. 12, 2015

Related U.S. Application Data

(62) Division of application No. 13/663,815, filed on Oct. 30, 2012, now Pat. No. 9,120,275.

(51) Int. Cl.
| | |
|---|---|
| *B29C 65/00* | (2006.01) |
| *B32B 37/00* | (2006.01) |
| *B29C 70/34* | (2006.01) |
| *B29C 33/40* | (2006.01) |
| *B32B 37/10* | (2006.01) |
| *B29C 33/38* | (2006.01) |

(52) U.S. Cl.
CPC .............. *B29C 70/342* (2013.01); *B29C 33/405* (2013.01); *B29C 65/00* (2013.01); *B29C 66/00145* (2013.01); *B32B 37/00* (2013.01); *B32B 37/10* (2013.01); *B29C 2033/385* (2013.01)

(58) Field of Classification Search
CPC ........ B32B 37/10; B32B 37/00; B29C 65/00; B29C 66/00145
See application file for complete search history.

(56) References Cited

U.S. PATENT DOCUMENTS

| | | | | | |
|---|---|---|---|---|---|
| 5,316,171 | A | * | 5/1994 | Danner et al. | 220/592.21 |
| 5,589,016 | A | * | 12/1996 | Hoopingarner et al. | 156/87 |
| 5,853,651 | A | * | 12/1998 | Lindsay et al. | 264/512 |
| 9,120,275 | B2 | * | 9/2015 | Kline | B29C 33/405 |
| 2004/0113315 | A1 | * | 6/2004 | Graham | 264/266 |
| 2011/0097554 | A1 | * | 4/2011 | Kehrl | B29C 70/207 |
| | | | | | 428/174 |
| 2014/0116616 | A1 | * | 5/2014 | Kline | B29C 33/405 |
| | | | | | 156/285 |

FOREIGN PATENT DOCUMENTS

WO     WO 9619335 A1 *  6/1996   ............ B29C 31/085

OTHER PUBLICATIONS

Larberg. "Deformability of Unidirectional Prepreg Materials." Thesis KTH School of Engineering Sciences, May 2009, 29 pages.*
International Search Report and Written Opinion dated Jan. 15, 2014, regarding Application No. PCT/US2013/059834, 11 pages.*
Notice of Allowance, dated Apr. 14, 2015, regarding U.S. Appl. No. 13/663,815, 20 pages.*

* cited by examiner

*Primary Examiner* — Michael N Orlando
*Assistant Examiner* — Matthew Hoover
(74) *Attorney, Agent, or Firm* — Yee & Associates, P.C.

(57) ABSTRACT

A method and apparatus for forming a stack of composite layers into a desired shape is present. The stack of composite layers may be positioned on a tool and a number of compressible supports such that the stack of composite layers may be substantially flat on the tool and the stack of composite layers may be substantially flat on the number of compressible supports. A flexible sheet may be placed on top of the stack of composite layers. A vacuum load may be applied on the stack of composite layers on the tool and the number of compressible supports using the flexible sheet such that consolidation of the stack of composite layers occurs to form a desired shape on the tool and the number of compressible supports compress during forming of the desired shape.

20 Claims, 11 Drawing Sheets

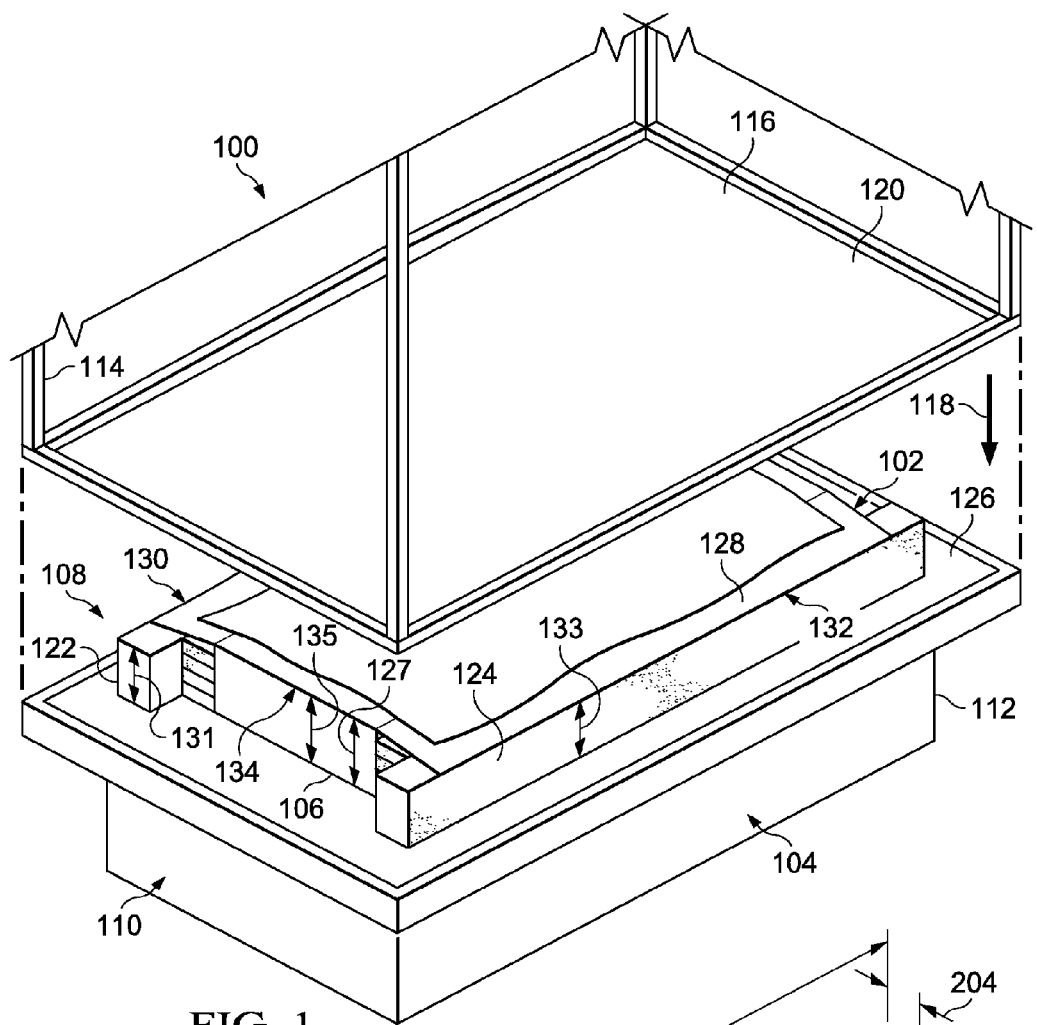
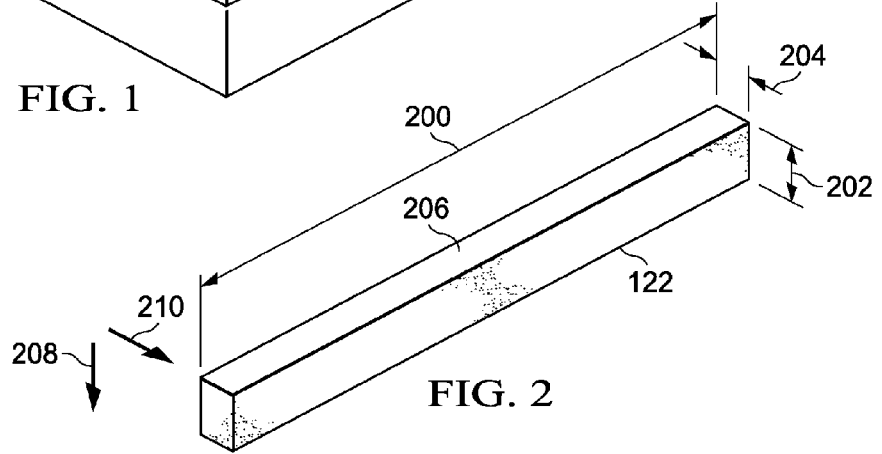
FIG. 1
FIG. 2

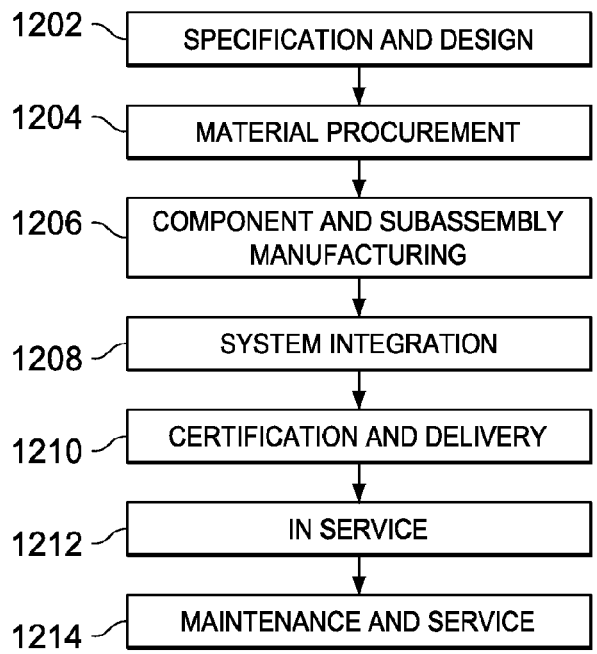
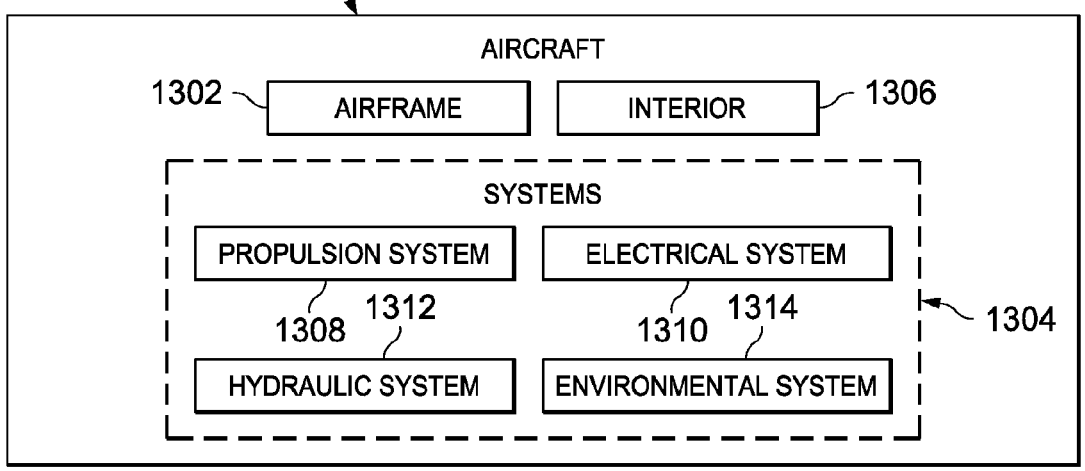

COMPOSITE LAYER FORMING SYSTEM

The present application is a divisional application of U.S. Pat. No. 9,120,275, filed Oct. 30, 2012, issued Sep. 1, 2015.

BACKGROUND INFORMATION

1. Field

The present disclosure relates generally to composite materials and, in particular, to manufacturing composite parts. Still more particularly, the present disclosure relates to a method and apparatus for forming shapes in layers of composite materials.

2. Background

Aircraft are being designed and manufactured with greater and greater percentages of composite materials. Composite materials may be used in aircraft to decrease the weight of the aircraft. This decreased weight improves performance features such as payload capacities and fuel efficiencies. Further, composite materials provide longer service life for various components in an aircraft.

Composite materials are strong, light-weight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

Further, using composite materials to create aerospace composite structures potentially allows for portions of an aircraft to be manufactured in larger pieces or sections. For example, a fuselage in an aircraft may be created in cylindrical sections. Other examples include, without limitation, wing sections joined to form a wing or stabilizer sections joined to form a stabilizer.

In manufacturing composite structures, layers of composite material are typically laid up on a tool. The layers of composite material may be comprised of fibers in sheets. These sheets may take the form of fabrics, tape, tows, or other suitable forms. In some cases, resin may be infused or pre-impregnated into the sheets. These types of sheets are commonly referred to as prepreg.

The different layers of prepreg may be laid up in different orientations and different numbers of layers may be used depending on the thickness of the composite structure being manufactured. These layers of prepreg may be laid up by hand or using automated lamination equipment such as a tape laminating machine or a fiber placement system.

A stack of the layers of preform composite material may be placed onto a tool for processing. This stack of composite layers may be referred to as a stack of composite layers and may take the form of a prepreg or preform. The stack of composite layers may be flat and may be placed onto a tool to shape the drape into a desired shape for a composite part.

A layer of flexible material in a flexible sheet may be placed over the stack of composite layers. This flexible material may be an elastomer vacuum bag. A vacuum may then be drawn to apply a vacuum load on the stack of composite layers. When the vacuum is applied, the flexible sheet may be pulled down through the vacuum around the tool to cause the stack of composite layers to change from a substantially flat shape to a desired shape for the composite part.

Oftentimes, the repeated forming of shapes from stacks of composite layers may result in the flexible sheet not performing as desired after a period of time. For example, the flexible sheet may fail while forming a shape from a stack of composite layers. Repeated stress from being stretched over a tool may result in a tear or opening occurring in the flexible sheet. This failure may result in the tool being unavailable for use until the flexible sheet can be replaced with a new flexible sheet.

Therefore, it would be desirable to have a method and apparatus that takes into account at least some of the issues discussed above, as well as other possible issues.

SUMMARY

In one illustrative embodiment, a method for forming a stack of composite layers into a desired shape may be present. The stack of composite layers may be positioned on a tool and a number of compressible supports such that the stack of composite layers may be substantially flat on the tool and the stack of composite layers may be substantially flat on the number of compressible supports. A flexible sheet is placed on top of the stack of composite layers. A vacuum load may be applied on the stack of composite layers on the tool and the number of compressible supports using the flexible sheet such that consolidation of the stack of composite layers occurs to form the desired shape on the tool and the number of compressible supports compress during forming of the desired shape.

In another illustrative embodiment, an apparatus comprises a platform, a number of compressible supports, and a flexible sheet. The platform may be configured to receive a tool. The number of compressible supports may be configured to be placed on the platform in a number of locations such that a stack of composite layers positioned on the tool and the number of compressible supports may be substantially flat on the tool and the stack of composite layers may be substantially flat on the number of compressible supports. The flexible sheet may be configured to be placed on top of the stack of composite layers such that a vacuum drawn on the flexible sheet results in the flexible sheet applying a vacuum load on the stack of composite layers on the tool and the number of compressible supports such that the stack of composite layers forms a desired shape on the tool and the number of compressible supports compress during forming of the desired shape.

In yet another illustrative embodiment, a method for forming a stack of composite layers into a desired shape for an aircraft part may be present. The stack of composite layers may be positioned on a tool and a number of compressible supports. A number of locations of the number of compressible supports may be configured to support a number of edges of the stack of composite layers. The number of locations of a number of compressible layers may support the number of edges of the stack of composite layers such that the stack of composite layers may remain substantially flat when heated prior to applying a vacuum load. The number of compressible supports may be comprised of a number of components selected from at least one of a foam, a polymer foam, an open cell foam, a closed cell foam, and a solid dispersed medium. The stack of composite layers may be a prepreg comprised of fabric layers with a thermoset resin infused into the fabric layers. A vacuum load may be applied on the stack of composite layers on the tool and the number of compressible supports. The stack of composite layers may form the desired shape on the tool and the number of compressible supports compress during forming of the desired shape. The desired shape may be formed by lowering a frame holding a flexible sheet comprised of silicon onto a platform on which the stack of composite layers may be located with the tool and the number of compressible supports such that a seal may be formed between the frame and the platform in which the seal is sufficient to apply a vacuum to cause the flexible sheet to apply the vacuum load on the stack of composite layers, the number of compressible supports, and the tool; and drawing the vacuum on the flexible sheet such that the flexible sheet may apply the vacuum load on the stack of composite layers. The protective sheet may be located between the flexible sheet and the stack of composite layers. The stack of composite layers may be heated prior to applying the vacuum load. The stack of composite layers with the desired shape may be removed from the tool. The stack of composite layers may be moved to a curing system. The stack of composite layers may be cured to form the aircraft part with the desired shape. The desired shape may be selected from one of a channel with walls and a shape for a part selected from one of a stringer, a beam, and a rail in which a life of the flexible sheet may be increased using the number of compressible supports.

In still another illustrative embodiment, a shape forming system for manufacturing an aircraft part comprises a platform, a number of compressible supports, a flexible sheet, and a frame. The platform may be configured to receive a tool. The number of compressible supports may be configured to be placed on the platform such that a stack of composite layers positioned on the tool and the number of compressible supports in a number of locations may be substantially flat on the tool and the number of compressible supports. The number of locations of the number of compressible supports may be configured to support a number of edges of the stack of composite layers. The stack of composite layers may remain substantially flat when heated prior to applying a vacuum load. The number of compressible supports may be comprised of a number of components selected from at least one of a foam, a polymer foam, an open cell foam, a closed cell foam, and a solid dispersed medium. The stack of composite layers may be a prepreg. The flexible sheet may be configured to be placed on top of the stack of composite layers such that a vacuum drawn on the flexible sheet may result in the flexible sheet applying the vacuum load on the stack of composite layers on the tool and the number of compressible supports such that the stack of composite layers forms a desired shape for the aircraft part on the tool and the number of compressible supports compress during forming of the desired shape. The frame holding the flexible sheet may form a seal with the platform when the frame with the flexible sheet is placed on the platform on top of the stack of composite layers on the tool and the number of compressible supports on the platform in which a life of the flexible sheet is increased using the number of compressible supports.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 1 is an illustration of a shape forming system in accordance with an illustrative embodiment;

FIG. 2 is an illustration of a compressible support in accordance with an illustrative embodiment;

FIG. 12 is an illustration of an aircraft manufacturing and service method in accordance with an illustrative embodiment;

FIG. 13 is an illustration of an aircraft in which an illustrative embodiment may be implemented.

DETAILED DESCRIPTION

Figure 3:
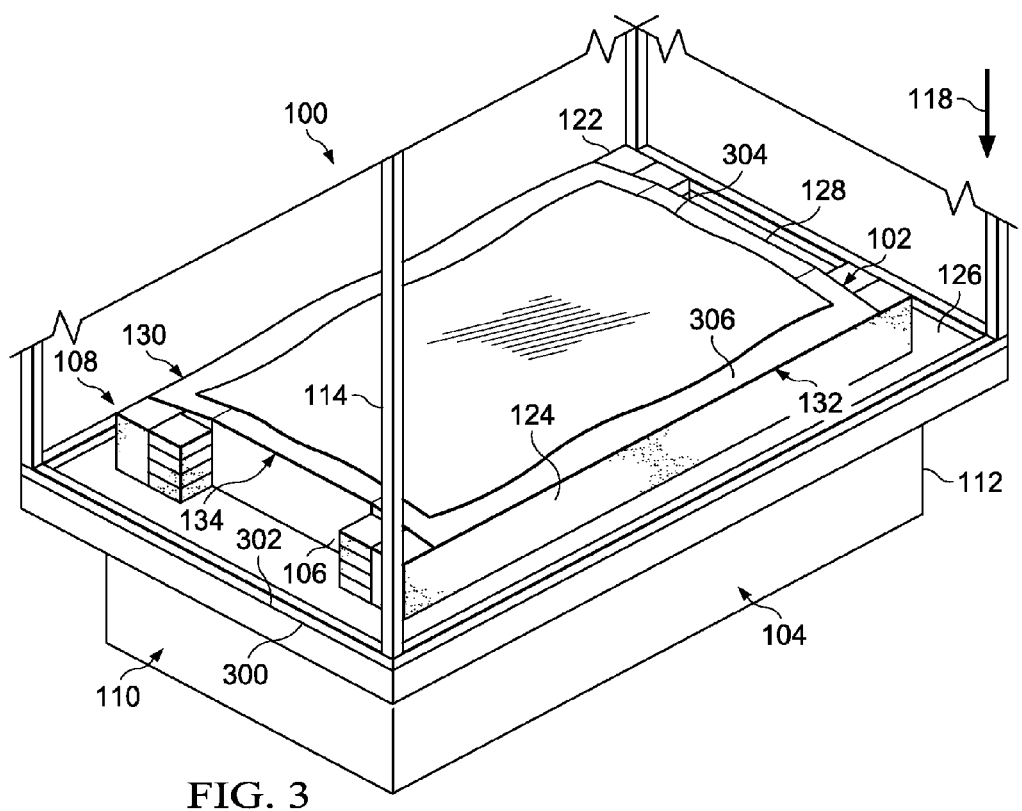
FIGS. 3-6 are illustrations of the shaping of a stack of composite layers in accordance with an illustrative embodiment.

The illustrative embodiments recognize and take into account one or more different considerations. For example, the illustrative embodiments recognize and take into account that the flexible sheet used when forming layers of composite material into a desired shape often takes the form of an elastomer vacuum bag. The flexible sheet may be comprised of silicon which may have a desired level of elasticity such that the flexible sheet may be drawn around a tool to apply a vacuum load on the stack of composite layers to form a part with the desired shape.

The illustrative embodiments recognize and take into account that other components, other than the composite layers, may be used during the process of forming the composite layers into a desired shape, while the composite layers are in an uncured form. The repeated stretching of the flexible sheet also occurs around these other components in addition to the tool. The illustrative embodiments also recognize and take into account that other components other than a tool may be configured to reduce the amount of stretching of the flexible sheet that occurs to conform to the tool and components in applying a vacuum load to the stack of composite layers to cause the stack of composite layers to conform to the shape of the tool to form a desired shape for a part from a stack of composite layers.

For example, the illustrative embodiments recognize and take into account that supports may be present around the tool that aid in holding the stack of composite layers in a substantially flat or planar form prior to the flexible sheet applying a vacuum load on the stack of composite layers to shape the stack of composite layers into a desired shape from the substantially flat shape.

This substantially flat shape may be desirable to reduce inconsistencies in the shape of the stack of composite layers formed from applying the vacuum load prior to shaping the stack of composite layers through the application of a vacuum load. For example, when the stack of composite layers may have a substantially flat shape prior to the vacuum load being applied, wrinkling may be reduced in the stack of composite layers during forming.

Thus, the illustrative embodiments provide a method and apparatus for forming a stack of composite layers into a desired shape for a composite part. In one illustrative embodiment, the stack of composite layers may be positioned on a tool with a number of compressible supports such that the stack of composite layers may be substantially flat on the tool and the stack of composite layers may be substantially flat on the number of compressible supports.

As used herein, a "number of" when used with reference to items means one or more items. For example, a number of compressible supports may be one or more compressible supports. A flexible sheet may be placed on top of the stack of composite layers. A vacuum load may be applied to the stack of composite layers on the tool and the number of compressible supports using the flexible sheet such that consolidation of the stack of composite layers occurs to form the desired shape of the tool and the number of compressible supports compress during the forming of the desired shape.

With reference now to the figures and, in particular, with reference to FIG. 1, an illustration of a shape forming system is depicted in accordance with an illustrative embodiment. In this depicted example, shape forming system 100 may be used to shape stack of composite layers 102 into a desired shape. In this illustrative example, shape forming system 100 may be a composite layer forming system that may include shape forming machine 104, tool 106, and compressible supports 108.

In this illustrative example, shape forming machine 104 may take the form of hot drape forming machine 110. As illustrated, shape forming machine 104 may include platform 112, frame 114, and flexible sheet 116. Flexible sheet 116 may be held in frame 114. Further, frame 114 may be moveable in the direction of arrow 118 toward platform 112.

In this illustrative example, flexible sheet 116 may be an elastomer sheet. In particular, flexible sheet 116 may take the form of elastomer vacuum bag 120 attached to frame 114. In these illustrative examples, flexible sheet 116 may be comprised of any polymer having an elastic property that allows for flexible sheet 116 to be deformed and substantially returned to its original shape.

In these illustrative examples, compressible supports 108 comprise compressible support 122 and compressible support 124. Compressible support 122 and compressible support 124 may be located on surface 126 of platform 112. Additionally, tool 106 may be also located on surface 126 of platform 112. In this example, tool 106 may have height 127.

In these illustrative examples, tool 106 may be located between a compressible supports 108 on surface 126 of platform 112. The placement of tool 106 and compressible supports 108 may be such that stack of composite layers 102 may be placed onto tool 106 and compressible supports 108. Specifically, a number of locations of a number of compressible supports 108 may be configured to support a number of edges of stack of composite layers 102.

In these illustrative examples, stack of composite layers 102 may be comprised of fabric and a resin infused into the fabric. In particular, stack of composite layers 102 may take the form of prepreg 128. Prepreg 128 may be comprised of fabric layers with a thermoset resin infused into the fabric layers.

In these illustrative examples, the positioning of compressible support 122 and compressible support 124 with respect to tool 106 may be such that stack of composite layers 102 may be substantially flat or planar when placed onto tool 106. As depicted, compressible support 122 provides support for side 130 of stack of composite layers 102. Compressible support 124 provides support for side 132 of stack of composite layers 102.

As depicted, side 130 may have height 131 and side 132 may have height 133. Center 134 of stack of composite layers 102 may have height 135.

Support provided by compressible support 122 and compressible support 124 may be such that height 131 of side 130 and height 133 of side 132 of stack of composite layers 102 remain substantially the same above surface 126 as height 135 of center 134 of stack of composite layers 102 on tool 106. In other words, stack of composite layers 102 remains substantially flat and may have a substantially flat or planar shape.

In these illustrative examples, compressible supports 108 may be configured in accordance with an illustrative embodiment. The configuration of compressible supports 108 may be such that the life of flexible sheet 116 may be increased when processing stacks of composite layers such as stack of composite layers 102. In other words, the life of flexible sheet 116 may be increased using compressible supports 108 to process stacks of composite layers such as stack of composite layers 102.

Turning now to FIG. 2, an illustration of a compressible support is depicted in accordance with an illustrative embodiment. In this depicted example, an isometric view of compressible support 122 from FIG. 1 is depicted. In this illustrative example, compressible support 122 may be an elongate member with a shape of a quadrilateral.

Compressible support 122 may have a substantially identical shape to compressible support 124 in FIG. 1. In this illustrative example, compressible support 122 may have length 200, height 202, and width 204. Length 200 may be at least the same length as stack of composite layers 102 in FIG. 1. Width 204 may be selected such that surface 206 may hold side 130 of stack of composite layers 102 when positioned on surface 126 of platform 112 relative to tool 106 in FIG. 1. Height 202 may be selected such that height 131 of side 130 of stack of composite layers 102 may be substantially the same as height 135 at center 134 of stack of composite layers 102.

In this illustrative example, height 202 of compressible support 122 may be, for example, without limitation, selected to be substantially equal to height 127 of tool 106. The selection may be such that a tolerance of about +0.25 inches to about −0.25 inches may be present between height 131 at side 130 of stack of composite layers 102 and height 135 at center 134 of stack of composite layers 102 as well as between height 133 at side 132 of stack of composite layers 102 and height 135 at center 134 of stack of composite layers 102 in some illustrative examples.

In these illustrative examples, compressible support 122 may be configured to be compressible in at least the direction of arrow 208. Of course, compressible support 122 also may be compressible in other directions such as the direction of arrow 210 depending on the particular implementation.

Turning now to FIGS. 3-6, illustrations of the shaping of a stack of composite layers are depicted in accordance with an illustrative embodiment. As depicted in FIG. 3, stack of composite layers 102 has been heated. As a result, stack of composite layers 102 may be less stiff than when in an unheated form. Stack of composite layers 102 may bend on side 130 and side 132 without compressible support 122 and compressible support 124 to provide support for side 130 and side 132 of stack of composite layers 102. With compressible support 122 and compressible support 124, stack of composite layers 102 may be substantially flat or planar even though stack of composite layers 102 may have been heated for forming a shape for a part.

As depicted, frame 114 with flexible sheet 116 may have been lowered in the direction of arrow 118 toward platform 112. In this illustrative example, flexible sheet 116 is not shown in order to see the components underneath flexible sheet 116.

In this illustrative example, edge 300 of frame 114 may contact edge 302 of platform 112 when frame 114 may be further lowered toward platform 112. In these illustrative examples, edge 300 and edge 302 may be configured to provide a seal when edge 300 and edge 302 contact each other. In these illustrative examples, edge 300 and edge 302 may include a sealant.

As depicted, protective sheet 304 has been placed onto surface 306 of stack of composite layers 102. Protective sheet 304 may be configured to protect stack of composite layers 102 from contamination by flexible sheet 116 when flexible sheet 116 may be moved onto stack of composite layers 102. In other words, protective sheet 304 may provide a barrier film between stack of composite layers 102 and flexible sheet 116.

Protective sheet 304 may be comprised of a flexible material such as an elastomer, fiberglass, or some other suitable type of material that may be stretched during curing of stack of composite layers 102 such that the stretching does not cause a tear or opening in protective sheet 304. In some illustrative examples, protective sheet 304 and/or an additional protective sheet may also be a peel ply. When protective sheet 304 functions as a peel ply, this peel ply may protect stack of composite materials 102 from dust, dirt, and other contaminates located on flexible sheet 116.

An additional protective sheet (not shown) may be present between stack of composite layers 102 and tool 106 in addition to protective sheet 304. The additional protective sheet (not shown) also may prevent contamination of stack of composite layers 102 from tool 106. In other illustrative embodiments, another protective sheet (not shown) may also be present between stack of composite layers 102 and compressible supports 108 depending on the particular implementation.

Figure 4:
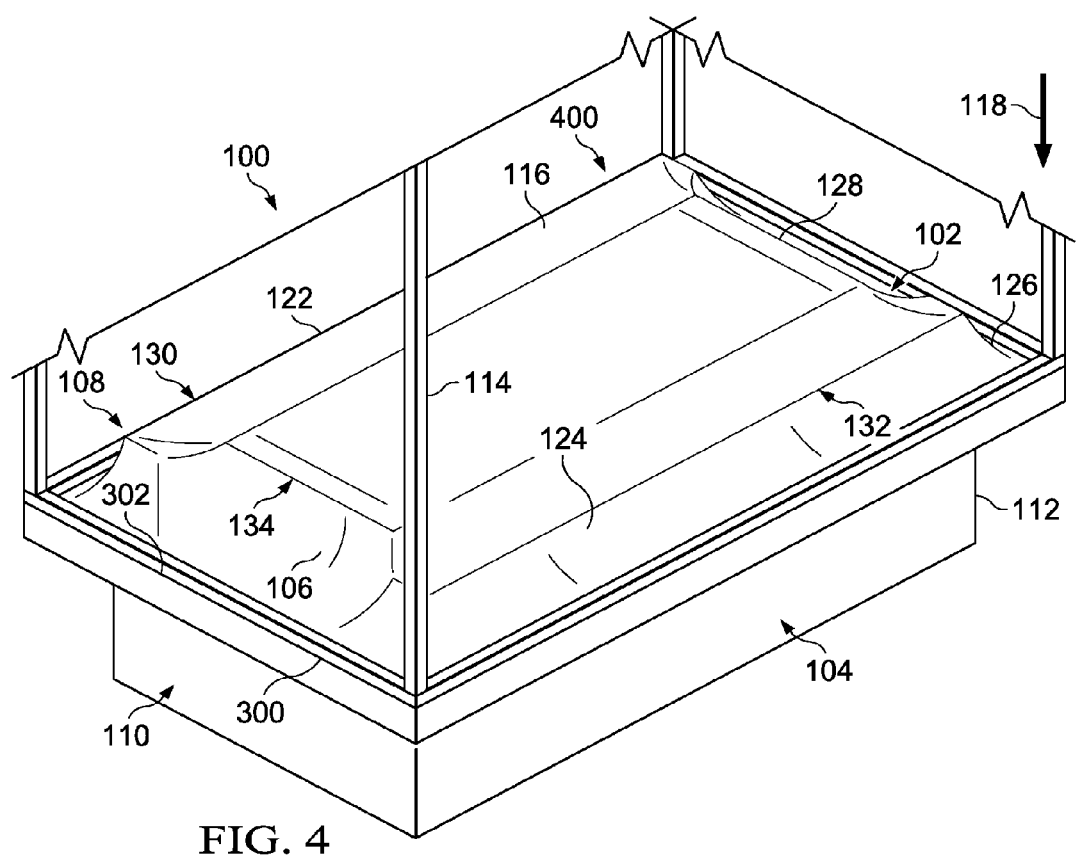

With reference now to FIG. 4, an illustration of a flexible sheet on a stack of composite layers in a shape forming machine is depicted in accordance with an illustrative embodiment. In this illustrative example, flexible sheet 116 has been placed onto stack of composite layers 102.

Flexible sheet 116, however, does not directly contact stack of composite layers 102. Protective sheet 304 (not shown) may be located between flexible sheet 116 and surface 306 of stack of composite layers 102.

With flexible sheet 116 placed on top of stack of composite layers 102 and edge 300 of frame 114 in contact with edge 302 of platform 112, stack of composite layers 102 may be ready to be formed into a shape for a part.

With frame 114 lowered onto platform 112, seal 400 may be formed between frame 114 and platform 112. Seal 400 may be formed between edge 300 of frame 114 and edge 302 of platform 112. In these illustrative examples, seal 400 may be sufficient to apply a vacuum to cause flexible sheet 116 to apply a vacuum load on stack of composite layers 102. In this illustrative example, a vacuum may be drawn in the space defined by frame 114 in flexible sheet 116 and surface 126 of platform 112. In this illustrative example, the vacuum may be drawn from a vacuum source that may be located in platform 112 or in another location.

Figure 5:
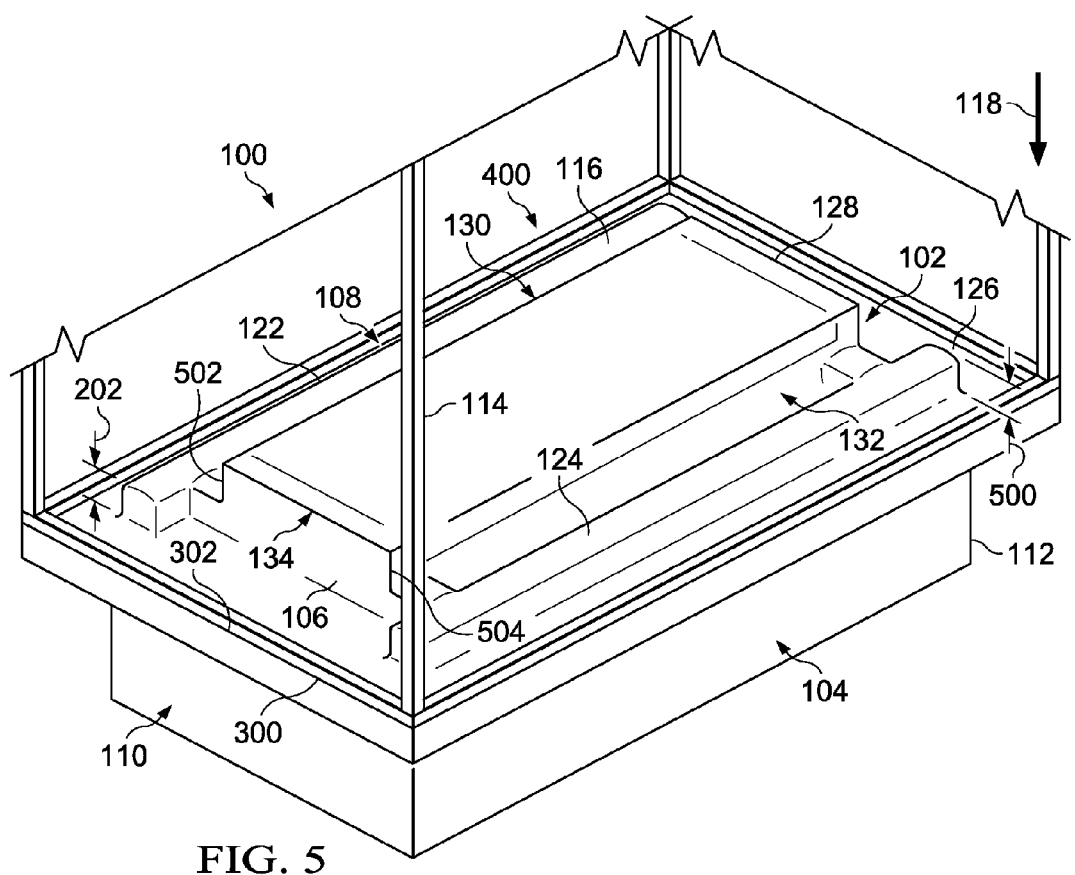

With reference now to FIG. 5, an illustration of the processing of a stack of composite layers to form a shape for a part is depicted in accordance with an illustrative embodiment. In this illustrative example, a vacuum load may be applied to stack of composite layers 102 on tool 106 and compressible supports 108. This vacuum load may be generated by flexible sheet 116 in response to a vacuum being drawn in the space between flexible sheet 116 and surface 126 of platform 112.

In this illustrative example, the vacuum load causes height 202 of compressible support 122 and height 500 of compressible support 124 to be reduced. Height 202 of compressible support 122 and height 500 of compressible support 124 may be reduced because of compression caused by the atmospheric pressure applied to flexible sheet 116 when the vacuum is drawn in the space between flexible sheet 116 and surface 126 of platform 112.

As can be seen, side 130 and side 132 may still be supported by compressible support 122 and compressible support 124 although side 130 and side 132 may not be substantially planar with center 134. In this example, the vacuum load applied to stack of composite layers 102 causes side 130 and side 132 to conform to side 502 and side 504 of tool 106.

Figure 6:
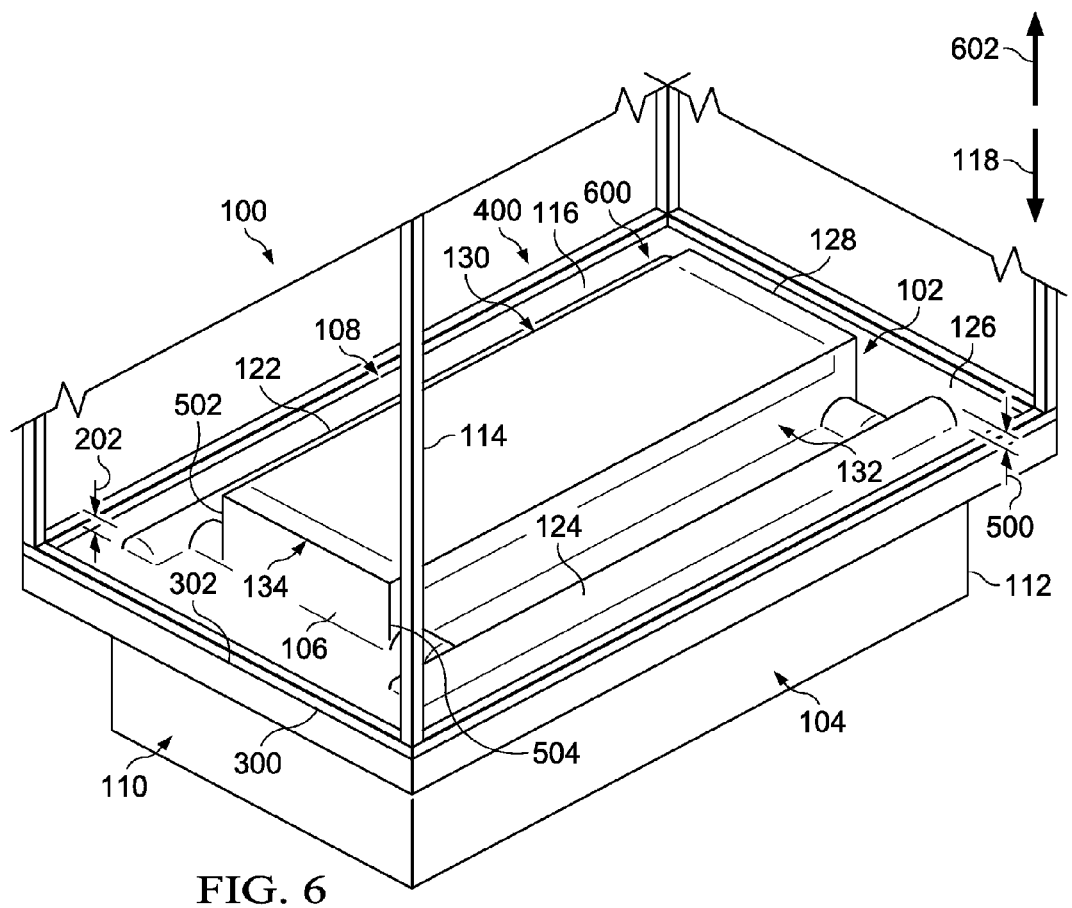

Turning now to FIG. 6, an illustration of the processing of a stack of composite layers to form a shape for a part is depicted in accordance with an illustrative embodiment. In this illustration, the vacuum load applied to stack of composite layers 102 may cause side 130 and side 132 to be shaped or bent against side 502 and side 504 of tool 106, respectively. As can be seen, side 130 and side 132 may no longer be supported by compressible support 122 and compressible support 124, respectively.

Figure 7:
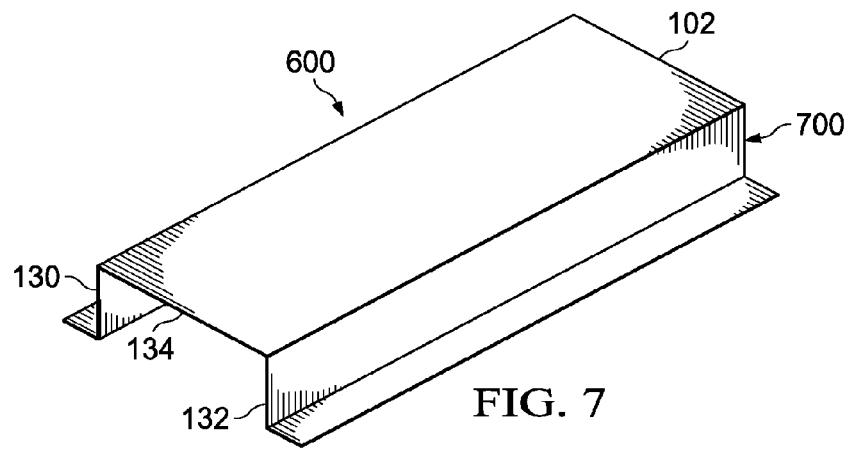
FIG. 7 is an illustration of a stack of composite layers with a desired shape in accordance with an illustrative embodiment.

In this view, stack of composite layers 102 may have desired shape 600. Desired shape 600 may take many different forms. In this illustrative example, desired shape 600 may include a channel with walls as shown in FIG. 7.

As depicted, desired shape 600 may be a stringer, a beam, a rail, or some other desirable shape for a composite part. After some period of time, the vacuum load may be removed from stack of composite layers 102.

Frame 114 with flexible sheet 116 may be raised in the direction of arrow 602. Thereafter, stack of composite layers 102 with desired shape 600 may be removed from tool 106.

Further, when frame 114 with flexible sheet 116 may be moved in the direction of arrow 602, compressible support 122 and compressible support 124 may substantially return to their original shapes. In other words, height 202 of compressible support 122 and height 500 of compressible support 124 may return substantially to the original height prior to application of a vacuum load.

Turning now to FIG. 7, an illustration of a stack of composite layers with a desired shape is depicted in accordance with an illustrative embodiment. In this depicted example, stack of composite layers 102 with desired shape 600 may be removed from tool 106. As can be seen, stack of composite layers 102 with desired shape 600 takes the form of stringer 700 in this illustrative example. Stringer 700 may be a composite stringer as depicted in this illustrative example. Stack of composite layers 102 with desired shape 600 may be placed onto another tool or curing system for curing stack of composite layers 102 to form a cured form of stringer 700.

Figure 8:
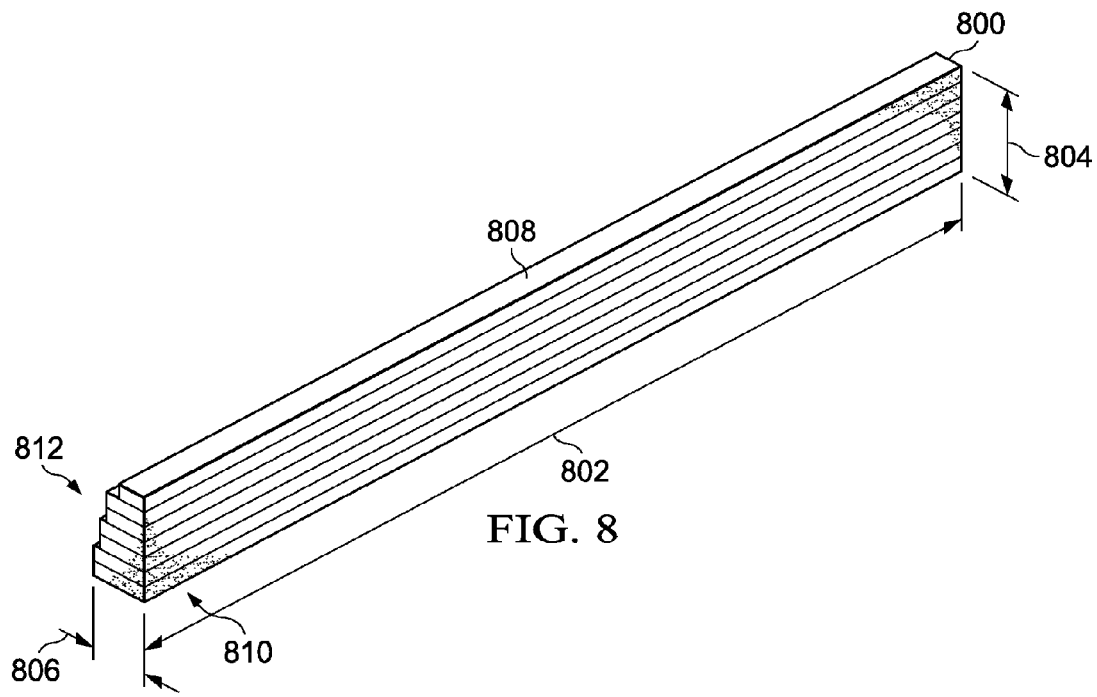
FIG. 8 is an illustration of a compressible support in accordance with an illustrative embodiment.

With reference now to FIG. 8, an illustration of a compressible support is depicted in accordance with an illustrative embodiment. In this depicted example, compressible support 800 may be an example of another configuration of a compressible support in compressible supports 108 that may be used in shape forming system 100 in FIG. 1.

As can be seen, compressible support 800 may have length 802, height 804, and stair-stepped width 806. Stair-stepped width 806 may be smaller at top side 808 as compared to bottom side 810.

Additionally, in this illustrative example, compressible support 800 may be comprised of number of compressible layers 812 that may be associated with each other. When one component is "associated" with another component, the association may be a physical association in these depicted examples. For example, a first component may be considered to be associated with a second component by being secured to the second component, bonded to the second component, mounted to the second component, welded to the second component, fastened to the second component, and/or connected to the second component in some other suitable manner.

The first component also may be connected to the second component using a third component. The first component may also be considered to be associated with the second component by being formed as part of and/or an extension of the second component.

The use of number of compressible layers 812 may be in contrast to the single component for compressible support 122 and compressible support 124 in FIGS. 1-6. In other words, a compressible support may be comprised of a single component or multiple components depending on the particular implementation. Further, with number of compressible layers 812, each of the quadrilaterals may have a different level of compressibility depending on the particular implementation.

A different level of compressibility may be present when a variation in a form speed may be present. Form speed may be the time needed for stack of composite layers 102 to change shape to conform to a surface of tool 106 when a load such as a vacuum load may be applied to stack of composite layers 102 using a device such as flexible sheet 116. The variation in form speed may be present with a complex surface on tool 106. In other words, the variation may occur when tool 106 may not be substantially planar.

The illustration of compressible support 122, compressible support 124, and compressible support 800 in the different figures are not meant to imply limitations to the manner in which different compressible supports may be implemented. In these illustrative examples, a compressible support may be selected as having various shapes and dimensions depending on tool 106 and stack of composite layers 102 to be shaped on tool 106.

Figure 9:
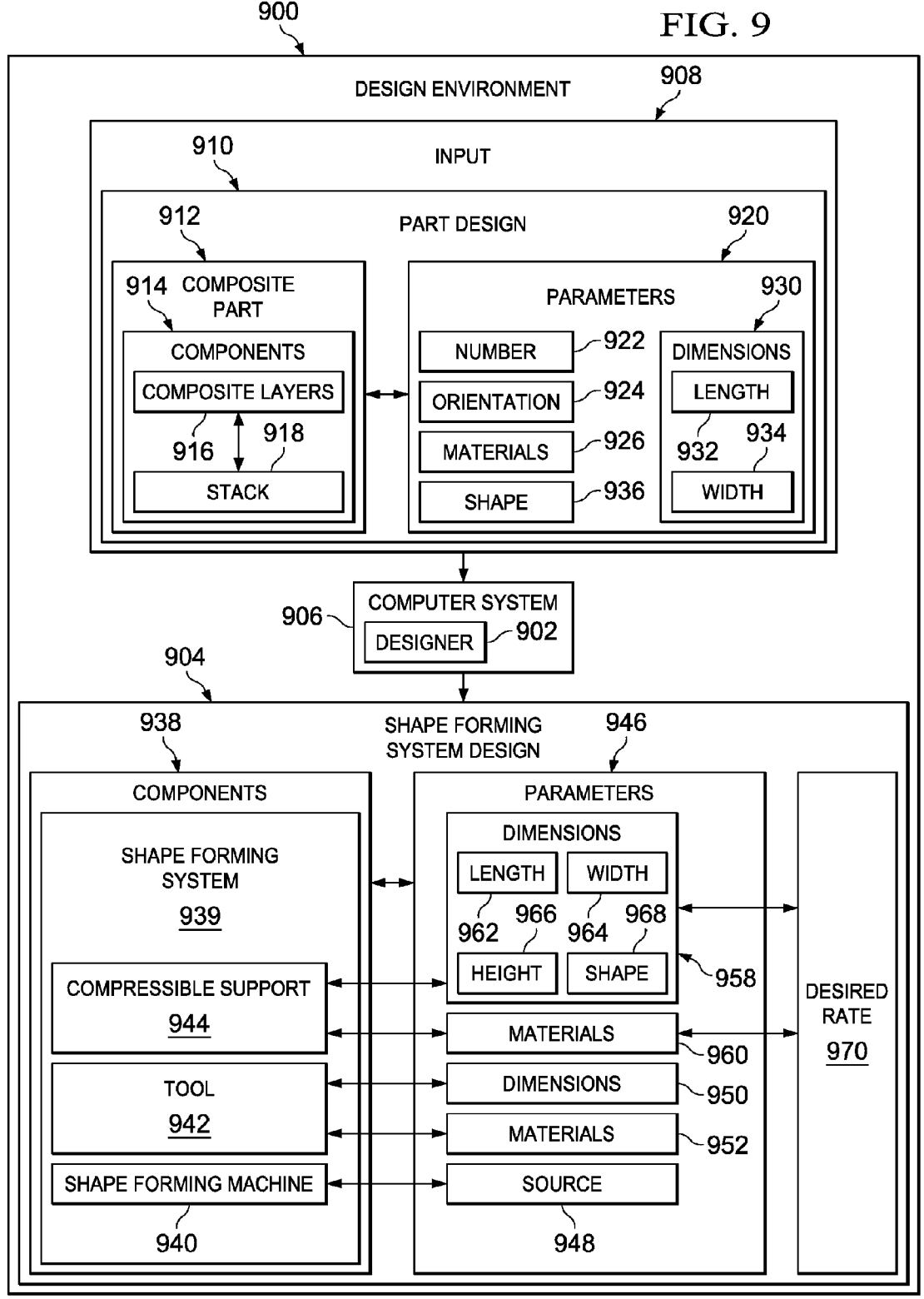
FIG. 9 is an illustration of a block diagram of a design environment in accordance with an illustrative embodiment.

With reference now to FIG. 9, an illustration of a block diagram of a design environment is depicted in accordance with an illustrative embodiment. In this depicted example, design environment 900 may include designer 902. Designer 902 may be used to generate shape forming system design 904. Shape forming system design 904 may be an example of a design for a shape forming system that may be used to shape stacks of composite layers. For example, shape forming system design 904 may be a design for shape forming system 100 and used to shape stack of composite layers 102 in FIG. 1.

In this illustrative example, designer 902 may be implemented using hardware, software, or a combination of the two. When software is used, operations performed by designer 902 may be implemented in program code configured to be run on a processor unit. When hardware is employed, the hardware may include circuits that operate to perform operations in designer 902. In these illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices.

In this illustrative example, designer 902 may be implemented using computer system 906. Computer system 906 may be comprised of one or more computers. When more than one computer is present in computer system 906, those computers may be in communication with each other over a communications medium such as a network (not shown).

As depicted, shape forming system design 904 may be generated using input 908. In this depicted example, input 908 may include part design 910. Part design 910 may be a design for composite part 912. Composite part 912 may be, for example, without limitation, an aircraft part. In these illustrative examples, part design 910 for composite part 912 may include components 914. Components 914 may be composite layers 916. In this illustrative example, composite layers 916 may be arranged to form stack 918 of composite layers 916.

In this illustrative example, the configuration of composite layers 916 in stack 918 may be described by parameters 920. For example, parameters 920 may identify number 922 for composite layers 916. In other words, number 922 may define how many layers may be present in composite layers 916 that form stack 918. In addition, parameters 920 also may identify orientation 924 for number 922 of composite layers 916 and materials 926 for use in composite layers 916.

Further, parameters 920 also may identify dimensions 930. Dimensions 930 may include, for example, length 932 and width 934 for composite layers 916. Another parameter in parameters 920 for composite part 912 may be shape 936 for stack 918 of composite layers 916. In these illustrative examples, shape 936 may be, for example, without limitation, a hat shape for a stringer or some other suitable shape depending on the form of composite part 912. These and other parameters in parameters 920 in part design 910 may be used by designer 902 to generate shape forming system design 904.

In this illustrative example, shape forming system design 904 may include components 938 for shape forming system 939. Components 938 may include, for example, shape forming machine 940, tool 942, compressible support 944, and other suitable components.

In these illustrative examples, parameters 946 may be present for components 938. For example, parameters 946 may identify source 948 for shape forming machine 940. In this illustrative example, shape forming machine 940 may be available from various manufacturers or suppliers. Source 948 may be a manufacturer, a supplier, or other vendor of shape forming machines.

Tool 942 may have dimensions 950 and materials 952. Dimensions 950 may be based on shape 936 for composite part 912. Tool 942 also may be comprised of materials 952. One or more of materials 952 may be used to form tool 942. Materials 952 may include at least one of a metal, steel, titanium, polycarbonate, and other suitable types of materials.

In these illustrative examples, compressible support 944 also may have dimensions 958 and materials 960 in parameters 946. Dimensions 958 may include, for example, without limitation, length 962, width 964, height 966, shape 968, and other suitable dimensions.

In this illustrative example, height 966 may be based on the height of tool 942. In particular, height 966 may be selected such that stack 918 of composite layers 916 have a substantially flat or planar shape when placed onto tool 942 for processing.

Materials 960 may be selected as materials that allow compression of compressible support 944. The compression of compressible support 944 may be selected such that compressible support 944 compresses at desired rate 970. Materials 960 for compressible support 944 may be selected from at least one of a foam, a polymer foam, an open cell foam, a closed cell foam, a solid dispersed medium, and other suitable materials.

With shape forming system design 904, one or more components for a shape forming system may be generated. In particular, components such as compressible supports may be manufactured and designed for use with existing shape forming systems. With shape forming system design 904, a shape forming system may be manufactured for use in shaping stacks of composite layers into desired shapes for composite parts.

The illustration of design environment 900 is not meant to imply physical or architectural limitations the manner in which a design environment may be implemented. Other components in addition to or in place of the ones illustrated may be used. Some components may be excluded. Also, the blocks are presented to illustrate some functional components. One or more of these blocks may be combined, divided, or combined and divided into different blocks when implemented in an illustrative embodiment.

For example, shape forming system design 904 may only include a design for compressible support 944. In other illustrative examples, parameters 946 for shape forming machine 940 may be part of input 908.

Figure 10:
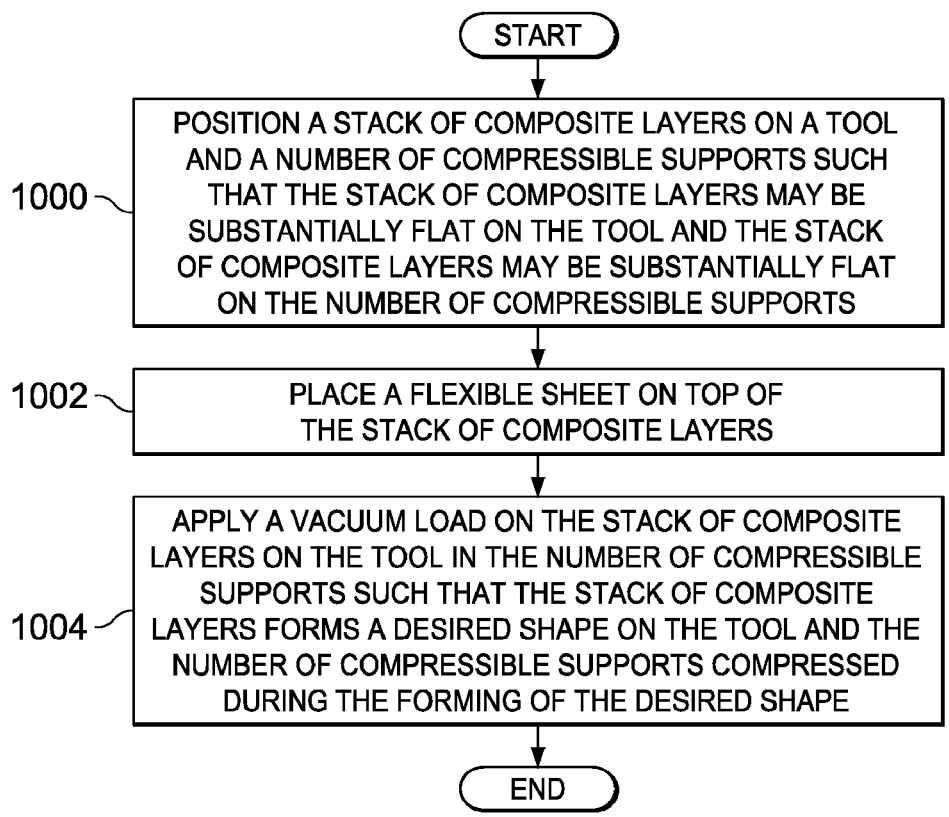
FIG. 10 is an illustration of a flowchart of a process for forming a stack of composite layers into a desired shape in accordance with an illustrative embodiment.

With reference now to FIG. 10, an illustration of a flowchart of a process for forming a stack of composite layers into a desired shape is depicted in accordance with an illustrative embodiment. The process illustrated in FIG. 10 may be implemented using shape forming system 100 in FIG. 1. In particular, the process may be used to generate a desired shape for stack of composite layers 102 in FIG. 1.

The process begins by positioning stack of composite layers 102 on tool 106 and number of compressible supports 108 such that stack of composite layers 102 may be substantially flat on tool 106 and stack of composite layers 102 may be substantially flat on number of compressible supports 108 (operation 1000). The process then places flexible sheet 116 on top of stack of composite layers 102 (operation 1002).

Next, the process applies a vacuum load on stack of composite layers 102 on tool 106 in number of compressible supports 108 such that stack of composite layers 102 forms a desired shape on tool 106 and number of compressible supports 108 compressed during the forming of the desired shape (operation 1004) with the process terminating thereafter.

Figure 11:
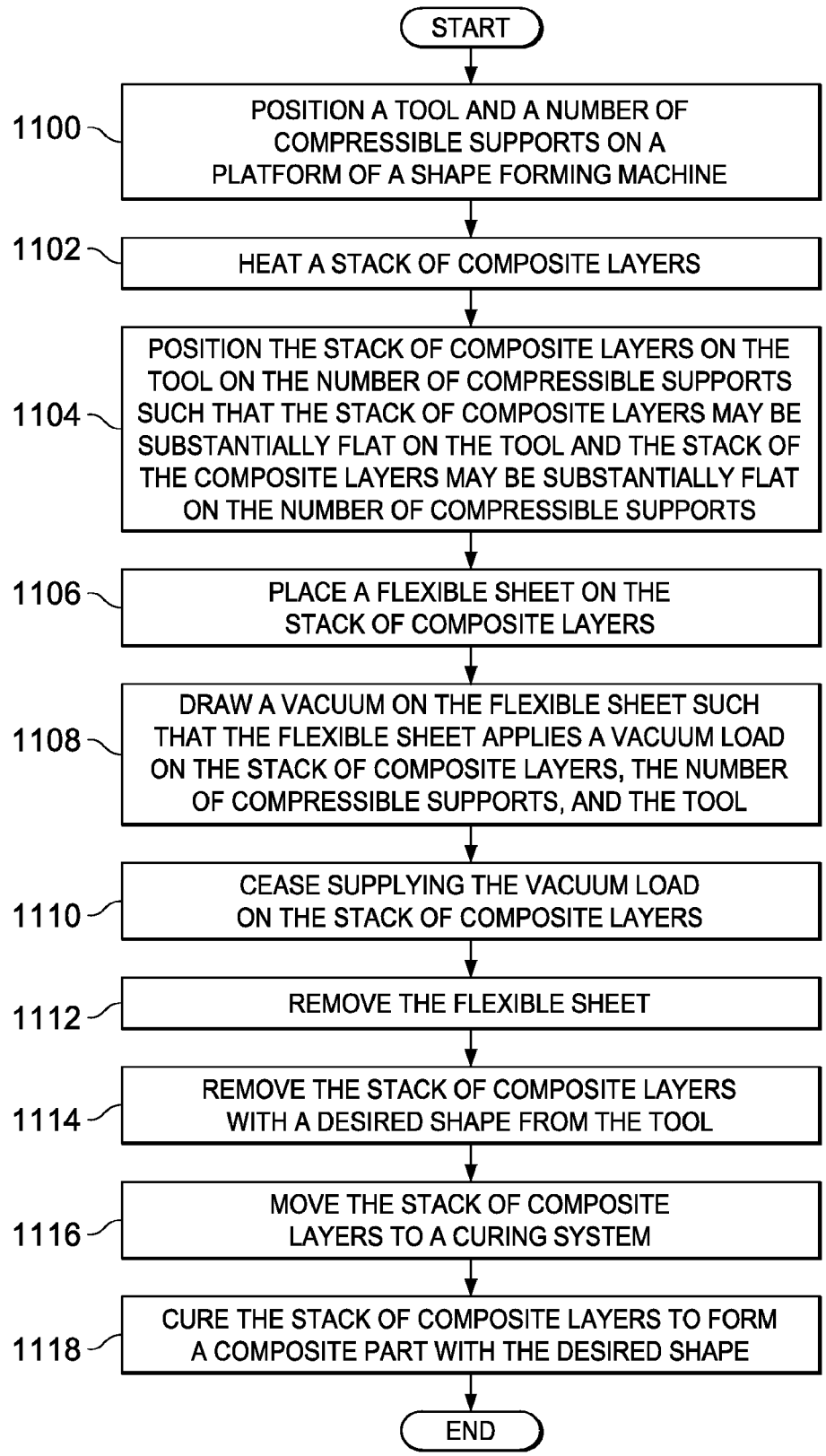
FIG. 11 is an illustration of a more detailed flowchart of a process for forming a stack of composite layers into a desired shape in accordance with an illustrative embodiment.

Turning now to FIG. 11, an illustration of a more detailed flowchart of a process for forming a stack of composite layers into a desired shape is depicted in accordance with an illustrative embodiment. The process illustrated in FIG. 11 may be implemented using shape forming system 100 in FIG. 1. This process may be used to shape stack of composite layers 102 into a desired shape for a composite part.

The process begins by positioning tool 106 and number of compressible supports 108 on platform 112 of shape forming machine 104 (operation 1100). Thereafter, the process heats stack of composite layers 102 (operation 1102). Stack of composite layers 102 may be prepreg 128 and may take the form of a hot drape when heated.

The process then positions stack of composite layers 102 on tool 106 on number of compressible supports 108 such that stack of composite layers 102 may be substantially flat on tool 106 and stack of composite layers 102 may be substantially flat on number of compressible supports 108 (operation 1104). In these illustrative examples, stack of composite layers 102 may be substantially flat against tool 106. Tool 106 may be substantially planar, have a curve, have a complex contour, or some other suitable shape. Next, the process places flexible sheet 116 on stack of composite layers 102 (operation 1106).

The placement of flexible sheet 116 on top of stack of composite layers 102 may be performed such that seal 400 may be formed in the space between flexible sheet 116 and surface 126 of platform 112 on which stack of composite layers 102 may be located. The process then draws a vacuum on flexible sheet 116 such that flexible sheet 116 applies a vacuum load on stack of composite layers 102, number of compressible supports 108, and tool 106 (operation 1108). In some cases, stack of composite materials 102 may be consolidated to remove voids, reduce volume, increase the fiber-to-volume ratio, or some combination thereof, depending on the particular implementation.

The process ceases supplying the vacuum load on stack of composite layers 102 (operation 1110). Flexible sheet 116 may be removed (operation 1112). Thereafter, stack of composite layers 102 with a desired shape may be removed from tool 106 (operation 1114). In operation 1114, stack of composite layers 102 may no longer be compressed with the removal of the vacuum load. By removing the compression, a decrease in fiber-to-volume ratio beyond desired values may be reduced or avoided. Stack of composite layers 102 may be moved to a curing system (operation 1116). Next, stack of composite layers 102 may be cured to form a composite part with the desired shape (operation 1118) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In these illustrative examples, one or more of the different operations may be performed using software running on a computer. Additionally, the operations may also be performed using hardware such as one or more circuits.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, the heating of the stack of composite layers in operation 1102 and the positioning for the stack of composite layers in the number of compressible supports in operation 1104 may be performed at substantially the same time or in reverse order. As another example, operations may also be included that place protective sheets between the stack of composite layers and the tool and between the stack of composite layers and the flexible sheet.

Illustrative embodiments of the disclosure may be described in the context of aircraft manufacturing and service method 1200 as shown in FIG. 12 and aircraft 1300 as shown in FIG. 13. Forming of stack of composite layers 102 for composite parts in aircraft 1300 may occur during manufacturing and service method 1200.

Turning first to FIG. 12, an illustration of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1212. While in service 1212 by a customer, aircraft 1300 in FIG. 13 may be scheduled for routine maintenance and service 1214, which may include modification, reconfiguration, refurbishment, and other maintenance or service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative embodiment may be implemented. In this example, aircraft 1300 may be produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example may be shown, different illustrative embodiments may be applied to other industries, such as the automotive industry.

Apparatuses and methods embodied herein may be employed during at least one of the stages of aircraft manufacturing and service method 1200 in FIG. 12. An illustrative embodiment may be implemented during component and subassembly manufacturing 1206 to shape stacks of composite layers into desired shapes that may be cured to form composite parts with desired shapes. Additionally, one or more illustrative embodiments also may be implemented during maintenance and service 1214. The illustrative embodiments may be implemented to shape stacks of composite layers for manufacturing composite parts that may be used during maintenance, refurbishment, upgrades, and other operations that may be performed during maintenance and service 1214.

Figure 14:
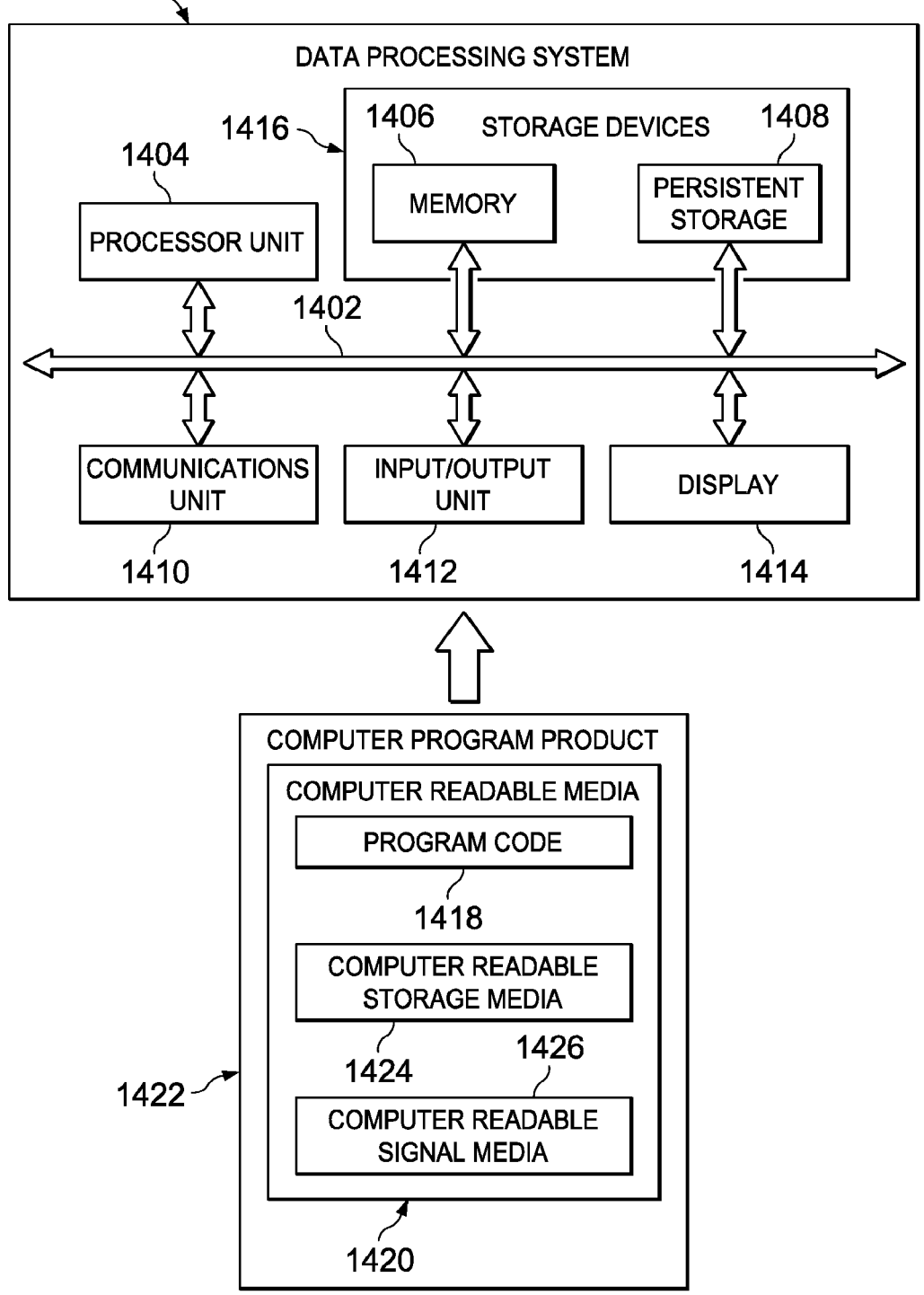
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement designer 902 in computer system 906 in FIG. 9.

In this illustrative example, data processing system 1400 may include communications framework 1402, which provides communications between processor unit 1404, memory 1406, persistent storage 1408, communications unit 1410, input/output unit 1412, and display 1414. In this example, communication framework may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 may be examples of storage devices 1416. A storage device may be any piece of hardware that may be capable of storing information, such as, for example, without limitation, data, program code in functional form, and/or other suitable information either on a temporary basis and/or a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 may be a network interface card.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which may be in communication with processor unit 1404 through communications framework 1402. The processes of the different embodiments may be performed by processor unit 1404 using computer-implemented instructions, which may be located in a memory, such as memory 1406.

These instructions may be referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 may be located in a functional form on computer readable media 1420 that may be selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426.

In these illustrative examples, computer readable storage media 1424 may be a physical or tangible storage device used to store program code 1418 rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1400 are not meant to provide architectural limitations to the manner in which different embodiments may be implemented. The different illustrative embodiments may be implemented in a data processing system including components in addition to and/or in place of those illustrated for data processing system 1400. Other components shown in FIG. 14 can be varied from the illustrative examples shown. The different embodiments may be implemented using any hardware device or system capable of running program code 1418.

Thus, the illustrative embodiments provide a method and apparatus for shaping stacks of composite layers into desired shapes. The illustrative embodiments may increase the lifespan of flexible sheets that may be used to apply vacuum loads to stacks of composite layers. The illustrative embodiments use compressible supports that may reduce the amount of stretching that occurs when a vacuum load may be applied to a flexible sheet in shaping a stack of composite layers. In this manner, the cost of manufacturing composite parts and, in particular, maintenance for shape forming machines may be reduced using one or more illustrative embodiments.

The description of the different illustrative embodiments may have been presented for purposes of illustration and description, and may be not intended to be exhaustive or limited to the embodiments in the form disclosed. Many modifications and variations will be apparent to those of ordinary skill in the art.

For example, although the illustrative examples for an illustrative embodiment are described with respect to an aircraft, an illustrative embodiment may be applied to other types of objects. The object may be, for example, without limitation, a mobile object, a stationary object, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable objects.

Further, different illustrative embodiments may provide different features as compared to other illustrative embodiments. The embodiment or embodiments selected may be chosen and described in order to best explain the principles of the embodiments, the practical application, and to enable others of ordinary skill in the art to understand the disclosure for various embodiments with various modifications as may be suited to the particular use contemplated.

What is claimed is:

1. An apparatus comprising:
    a platform configured to receive a tool;
    a number of compressible supports configured to be placed on the platform in a number of locations such that a stack of composite layers positioned on the tool and the number of compressible supports is substantially flat on the tool and the stack of composite layers is substantially flat on the number of compressible supports; and
    a flexible sheet configured to be placed on top of the stack of composite layers such that a vacuum drawn on the flexible sheet results in the flexible sheet applying a vacuum load on the stack of composite layers on the tool and the number of compressible supports such that the stack of composite layers forms a desired shape on the tool and the number of compressible supports compress during forming of the desired shape.

2. The apparatus of claim 1, wherein the number of locations of the number of compressible supports is configured to support a number of edges of the stack of composite layers such that the stack of composite layers remains substantially flat when heated prior to applying the vacuum load.

3. The apparatus of claim 1 further comprising:
    a frame holding the flexible sheet, wherein the frame with the flexible sheet forms a seal with the platform when the frame with the flexible sheet is placed on the platform on top of the stack of composite layers on the tool and the number of compressible supports on the platform.

4. The apparatus of claim 1, wherein the number of compressible supports is comprised of a number of components selected from at least one of a foam, a polymer foam, an open cell foam, a closed cell foam, and a solid dispersed medium.

5. The apparatus of claim 1, wherein the stack of composite layers is a prepreg.

6. A shape forming system for manufacturing an aircraft part, the shape forming system comprising:
    a platform configured to receive a tool;
    a number of compressible supports configured to be placed on the platform in a number of locations such that a stack of composite layers positioned on the tool and the number of compressible supports is substantially flat on the tool and the stack of composite layers is substantially flat on the number of compressible supports in which the number of locations of the number of compressible supports is configured to support a number of edges of the stack of composite layers such that the stack of composite layers remains substantially flat when heated prior to applying a vacuum load; in which the number of compressible supports is comprised of a number of components selected from at least one of a foam, a polymer foam, an open cell foam, a closed cell foam, and a solid dispersed medium; and in which the stack of composite layers is a prepreg;
    a flexible sheet configured to be placed on top of the stack of composite layers such that a vacuum drawn on the flexible sheet results in the flexible sheet applying the vacuum load on the stack of composite layers on the tool and the number of compressible supports such that the stack of composite layers forms a desired shape for the aircraft part on the tool and the number of compressible supports compress during forming of the desired shape; and
    a frame holding the flexible sheet in which the frame with the flexible sheet forms a seal with the platform when the frame with the flexible sheet is placed on the platform on top of the stack of composite layers on the tool and the number of compressible supports on the platform in which a life of the flexible sheet is increased using the number of compressible supports.

7. The apparatus of claim 3, wherein at least one of a first edge of the frame or a second edge of the platform includes a sealant.

8. The apparatus of claim 5, wherein the prepreg comprises fabric layers with a thermoset resin infused into the fabric layers.

9. The apparatus of claim 1, wherein a life of the flexible sheet is increased using the number of compressible supports.

10. The apparatus of claim 1, wherein the flexible sheet is comprised of silicon.

11. The apparatus of claim 1, wherein the desired shape includes a channel with walls.

12. The apparatus of claim 1, wherein the desired shape is a shape for a part selected from one of a stringer, a beam, and a rail.

13. The apparatus of claim 1, wherein a tolerance of about +0.25 inches to about −0.25 inches is present between a height of a side of the stack of composite layers and a height at center of the stack of composite layers.

14. The apparatus of claim 1, wherein the number of compressible supports compresses in only one direction.

15. The apparatus of claim 1, wherein the number of compressible supports compresses in more than one direction.

16. The apparatus of claim 1 further comprising a protective sheet on a surface of the stack of composite layers, wherein the protective sheet is configured to protect the stack of composite layers from contamination by the flexible sheet.

17. The apparatus of claim 16, wherein the protective sheet is comprised of a flexible material that may be stretched during curing of the stack of composite layers such that stretching does not cause a tear or opening in that protective sheet.

18. The apparatus of claim 1 further comprising a protective sheet between the tool and the stack of composite layers, wherein the protective sheet is configured to protect the stack of composite layers from contamination by the flexible sheet.

19. The apparatus of claim 18, wherein the protective sheet is an elastomer sheet.

20. The apparatus of claim 1, wherein a compressible support of the number of compressible supports comprises a plurality of layers wherein each layer of the plurality of layers has a different level of compressibility.

* * * * *